(12) United States Patent
Jung et al.

(10) Patent No.: US 12,248,814 B2
(45) Date of Patent: Mar. 11, 2025

(54) METHOD AND APPARATUS FOR ACCELERATING GNN PRE-PROCESSING

(71) Applicant: KOREA ADVANCED INSTITUTE OF SCIENCE AND TECHNOLOGY, Daejeon (KR)

(72) Inventors: Myoungsoo Jung, Daejeon (KR);
Seungkwan Kang, Daejeon (KR);
Donghyun Gouk, Daejeon (KR);
Miryeong Kwon, Daejeon (KR);
Hyunkyu Choi, Daejeon (KR);
Junhyeok Jang, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 36 days.

(21) Appl. No.: 18/453,702

(22) Filed: Aug. 22, 2023

(65) Prior Publication Data
US 2024/0303122 A1    Sep. 12, 2024

(30) Foreign Application Priority Data
Mar. 7, 2023    (KR) .......................... 10-2023-0030199

(51) Int. Cl.
*G06F 7/76* (2006.01)
*G06F 7/36* (2006.01)
*G06F 9/50* (2006.01)

(52) U.S. Cl.
CPC .............. *G06F 9/5027* (2013.01); *G06F 7/36* (2013.01)

(58) Field of Classification Search
CPC ................................. G06F 9/5027; G06F 7/36
See application file for complete search history.

(56) References Cited

U.S. PATENT DOCUMENTS

| | | | |
|---|---|---|---|
| 2020/0118027 A1* | 4/2020 | Kikuchi | ............... G06F 21/564 |
| 2022/0286366 A1 | 9/2022 | Hong et al. | |

(Continued)

FOREIGN PATENT DOCUMENTS

| | | |
|---|---|---|
| KR | 10-2022-0124106 A | 9/2022 |
| KR | 10-2022-0144539 A | 10/2022 |

OTHER PUBLICATIONS

Xu, Graph Partitioning and Graph Neural Network Based Hierarchical Graph Matching for Graph Similarity Computation, 2021, Elsevier, pp. 348-362. (Year: 2021).*

(Continued)

*Primary Examiner* — Cheng Yuan Tseng
(74) *Attorney, Agent, or Firm* — Sughrue Mion, PLLC

(57) ABSTRACT

Provided is an apparatus for accelerating graph neural network (GNN) pre-processing, the apparatus including a set-partitioning accelerator configured to sort each edge of an original graph stored in a coordinate list (COO) format by a node number, perform radix sorting based on a vertex identification (VID) to generate a COO array of a preset length, and perform uniform random sampling on some nodes of a given node array, a merger configured to merge the COO array of the preset length to generate one sorted COO array, a re-indexer configured to assign new consecutive VIDs respectively to the nodes selected through the uniform random sampling, and a compressed sparse row (CSR) converter configured to the edges sorted by the node number into a CSR format.

14 Claims, 13 Drawing Sheets

(56) References Cited

U.S. PATENT DOCUMENTS

| | | | |
|---|---|---|---|
| 2023/0137162 A1* | 5/2023 | Li | G06F 16/9024 |
| | | | 707/798 |
| 2023/0214636 A1* | 7/2023 | Lee | G06N 3/063 |
| | | | 706/16 |
| 2023/0297487 A1* | 9/2023 | Kim | G06F 11/3037 |
| | | | 702/176 |
| 2024/0028878 A1* | 1/2024 | Yu | G06N 3/042 |

OTHER PUBLICATIONS

Bouritsas, Improving Graph Neural Network Expressivity via Subgraph Isomorphism Counting, Jan. 2023, IEEE, pp. 657-668. (Year: 2023).*
Mingyu Yan et al., "HyGCN: A GCN Accelerator with Hybrid Architecture", 2020 IEEE International Symposium on High Performance Computer Architecture (HPCA), 2020, pp. 15-29.

* cited by examiner

METHOD AND APPARATUS FOR ACCELERATING GNN PRE-PROCESSING

CROSS-REFERENCE TO RELATED APPLICATIONS

This application is based on and claims priority under 35 U.S.C. § 119 to Korean Patent Application No. 10-2023-0030199, filed on Mar. 7, 2023, in the Korean Intellectual Property Office, the disclosure of which is incorporated by reference herein in its entirety.

BACKGROUND

1. Field

The disclosure relates to a method of accelerating and automating graph neural network (GNN) pre-processing.

This study has been carried out under the Samsung Future Technology Development Project (Task Number: SRFC-IT2101-04).

2. Description of the Related Art

A graph neural network (GNN) enables generalization of an existing deep training system such as a deep neural network (DNN) by training information about a graph. A GNN operation requires GNN pre-processing before GNN processing. However, most time is consumed to perform GNN pre-processing rather than to perform the GNN operation.

PRIOR TECHNICAL DOCUMENT

Patent Document

KR 10-2022-0144539 A

SUMMARY

The disclosure is provided to accelerate and automate a GNN pre-processing process.

Additional aspects will be set forth in part in the description which follows and, in part, will be apparent from the description, or may be learned by practice of the presented embodiments of the disclosure.

According to an aspect of the disclosure, an apparatus for accelerating graph neural network (GNN) pre-processing includes a set-partitioning accelerator configured to sort each edge of an original graph stored in a coordinate list (COO) format by a node number, perform radix sorting based on a vertex identification (VID) to generate a COO array of a preset length, and perform uniform random sampling on some nodes of a given node array, a merger configured to merge the COO array of the preset length to generate one sorted COO array, a re-indexer configured to assign new consecutive VIDs respectively to the nodes selected through the uniform random sampling, and a compressed sparse row (CSR) converter configured to the edges sorted by the node number into a CSR format.

In an embodiment, the merger may be configured to start the process of merging the COO array before the set-partitioning accelerator completes radix sorting of the entire original graph in the COO format.

In an embodiment, the merger may be provided as a plurality of mergers capable of being pipelined.

In an embodiment, the re-indexer may include as many comparators as a number of slots of a hash table entry, and may configured to perform parallel processing on the comparators to determine whether the selected node is a new node.

In an embodiment, when the set-partitioning accelerator finishes performing uniform random sampling on one neighbor node array, the re-indexer may be further configured to determine whether the selected node is a new node.

According to another aspect of the disclosure, a method of accelerating graph neural network (GNN) pre-processing includes performing, by a set-partitioning accelerator, radix sorting based on a vertex identification (VID) of an original graph in a coordinate list (COO) format to generate a COO array of a preset length, merging, by a merger, the COO array of the preset length to generate one sorted COO array, converting, by a converter, the one sorted COO array into a compressed sparse row (CSR) format to generate a graph in a CSR format, performing, uniform random sampling, by a set-partitioning accelerator, to generate a sub-graph with a reduced degree of the graph in the CSR format, and generating, by an embedding table generation unit, an embedding table corresponding to the sub-graph, in which when the merger is provided as a plurality of mergers, pipelining is performed among the plurality of mergers.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
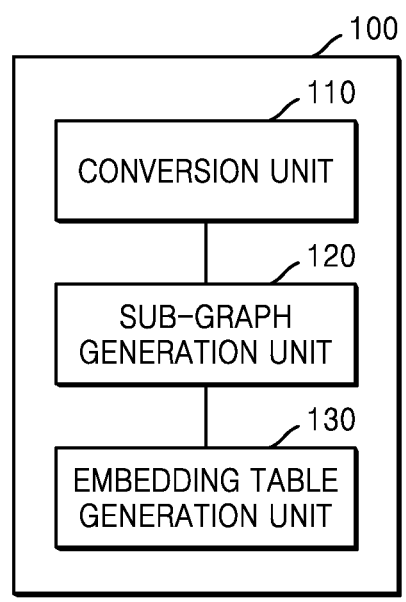
FIG. 1 is an internal structural diagram of an apparatus for accelerating graph neural network (GNN) pre-processing, according to an embodiment.

Reference will now be made in detail to embodiments, examples of which are illustrated in the accompanying drawings, wherein like reference numerals refer to like components throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of components, modify the entire list of components and do not modify the individual components of the list.

Hereinafter, a description will be made with reference to the drawings.

FIG. 1 is an internal structural diagram of an apparatus for accelerating graph neural network (GNN) pre-processing, according to an embodiment.

An apparatus 100 for accelerating GNN pre-processing may include a conversion unit 110, a sub-graph generation unit 120, and an embedding table generation unit 130.

The conversion unit 110 may convert an original graph in a coordinate list (COO) format into a graph in a compressed sparse row (CSR) format. The COO format may store a graph in the form of an edge-centric data structure, and the CSR format may store a graph in the form of a vertex-centric data structure.

To add new connection to the graph stored in the COO format, a new edge including two vertex identifications (VIDs) may be simply appended, thus facilitating updating.

In the CSR format, as destination nodes of each source node are clustered, it is easy to access destination nodes of a given source node. Such a source-centric feature may make it easy to collect embeddings of destination nodes corresponding to each source node in a GNN inference process. The conversion unit 110 may convert the COO format into the CSR format because the CSR format facilitates graph processing in the GNN inference process.

To this end, the conversion unit 110 may sort respective edges of an input original graph by vertex number and perform a data structure conversion process of reconstructing the sorted edges into the CSR format. The conversion unit 110 may convert the original graph in the COO format into the graph in the CSR format each time the graph is updated. An example of converting the COO format into the CSR format by the conversion unit 110 will refer to FIG. 2.

The sub-graph generation unit 120 may sample some nodes less than a preset number in the graph in the CSR format through uniform random sampling to generate a degree-reduced sub-graph. The sub-graph generation unit 120 may search for the graph in the CSR format received from the conversion unit 110. Starting with selecting a batch node, selecting nodes less than a preset number from a neighbor node array of each previously selected nodes may be repeated to perform uniform random sampling. The sub-graph generation unit 120 may generate a sub-graph with a reduced graph degree for each batch.

Figure 3:
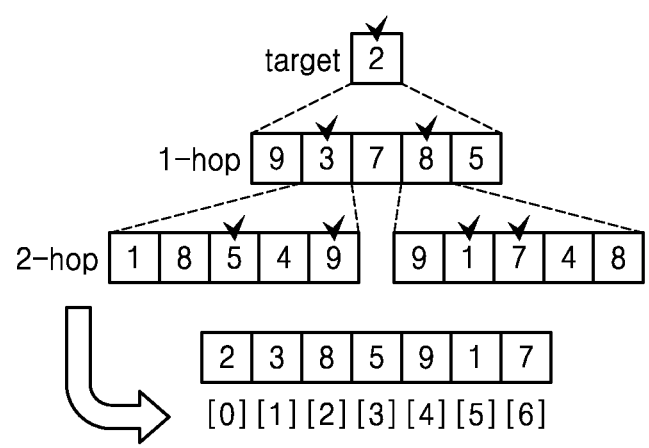
FIG. 3 is an example illustrating a sub-graph generation unit that generates a sub-graph with a reduced degree through equivalent random sampling, according to an embodiment.

Referring to FIG. 3, starting with uniform random sampling for a batch node '2', nodes '3' and '8' may be selected in a first hop, and uniform random sampling may be performed again in a second hop for each of the nodes '3' and '8' to select nodes '5', '9', '1', and '7'.

The sub-graph generation unit 120 may assign new consecutive VIDs to nodes of the sub-graph. The VID denotes an index number assigned to each node. Each node of the sub-graph may be assigned with a continuous VID starting from 0 so as to be sorted. An example of generating the sub-graph and assign the VID by the sub-graph generation unit will refer to FIGS. 3 and 4.

The embedding table generation unit 130 may generate an embedding table corresponding to the degree-reduced sub-graph generated by the sub-graph generation unit 120. As each node of the sub-graph generated by the sub-graph generation unit 120 is assigned with a new VID, an embedding table corresponding to the newly assigned VID may be required.

To this end, the embedding table generation unit 130 may generate an embedding table corresponding to a newly generated sub-graph merely with a selected node. The embedding table generation unit 130 may map a VID of the original graph in the COO format to a new VID of each node of the sub-graph to generate an embedding table. An internal structural diagram of the embedding table generation unit 130 will refer to FIG. 10.

Figure 2:
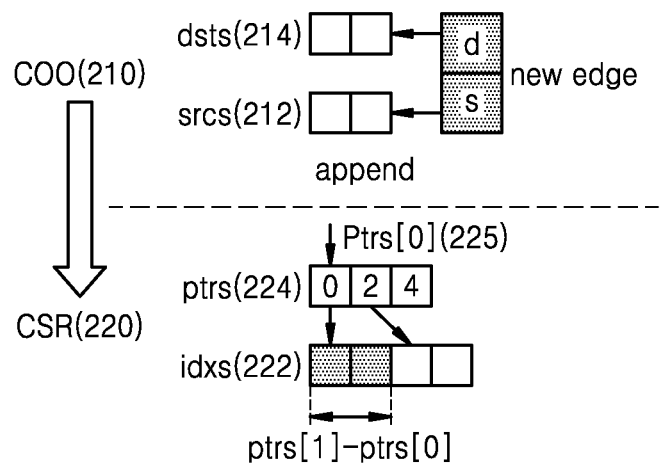
FIG. 2 is an example illustrating a conversion unit that performs conversion, according to an embodiment.

FIG. 2 is an example illustrating a conversion unit that performs conversion, according to an embodiment.

Referring to FIG. 2, the original graph may be stored in the form of the edge-centric data structure referred to as a COO 210 to facilitate updating. Each element in the COO format may include VIDs of a source node srcs 212 and a destination node dsts 214.

A format of a CSR 220 may include an index array idxs 222 and a pointer array ptrs 224.

The index array idxs 222 may store a node in a sorted form. For example, destination nodes may be sorted in the order of their source node's VID. Destination nodes having the same source node may be sorted in the order of their destination node's VID. Destination nodes for each source node may be sorted in the order of VIDs.

The pointer array ptrs 224 may store a range of the pointer array ptrs 224 indicated by each destination VID. Referring to FIG. 2, VID 0 may have neighbors from a ptrs[0]$^{th}$ 225 to a (ptrs[1]-1)$^{th}$ index among elements of idxs 222.

FIG. 3 is an example illustrating a sub-graph generation unit that generates a sub-graph with a reduced degree through equivalent random sampling, according to an embodiment. FIG. 3 is an example illustrating the sub-graph generation unit that may select two neighbor nodes among a neighbor node array of a batch node through a 2-hop neighbor sampling process. This is merely an example and the disclosure is not limited thereto. Moreover, 2-hop neighbor sampling taken as an example herein is well known and thus will not be described in detail.

Figure 4:
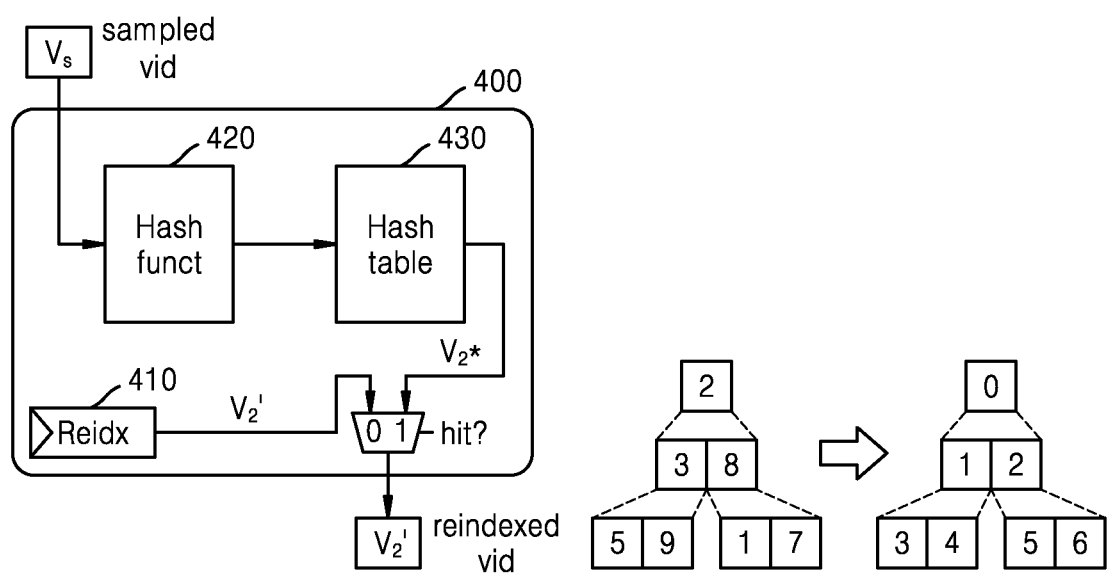
FIG. 4 is an example illustrating new consecutive vertex identifications (VIDs) that are assigned to a sub-graph, according to an embodiment.

FIG. 4 is an example illustrating a sub-graph generation unit that assigns a new VID to a selected node, according to an embodiment.

A re-indexer 400 may include a register 410, a hash function processing unit 420, and a hash table storing unit 430.

A Reidx register 410 may be counted by 1 each time when a node that has not been selected before is input, and may assign a new VID to a newly selected node using this value.

The hash table storing unit 430 may store a VID pair including the original VID and the newly assigned VID. The hash table storing unit 430 may include several entries accessible based on a hash function result processed by the hash function processing unit 420.

Upon input of the newly assigned VID, the re-indexer 400 may search for a corresponding value in the hash table storing unit 430. When there is no corresponding value, the re-indexer 400 may determine a corresponding node as a new node and add the same to a hash table. The value of the Reidx register 410 may be increased by 1 to wait for a new node. When the corresponding value is in the hash table, the original VID may be used as a tag for comparison to determine whether the same node is selected again or collision of the hash function occurs. The re-indexer 400 may return mapping information stored in the hash table when the same node is selected again.

In this way, the re-indexer 400 may newly label VIDs '$V_2$', '$V_3$', '$V_8$', '$V_5$', '$V_9$', '$V_1$', and '$V_7$' previously assigned in the original graph respectively to nodes '2', '3', '8', '5', '9', '1', and '7' selected in generation of the sub-graph, with new consecutive VIDs $V_0, V_1, V_2, \ldots,$ and $V_6$.

Figure 12:
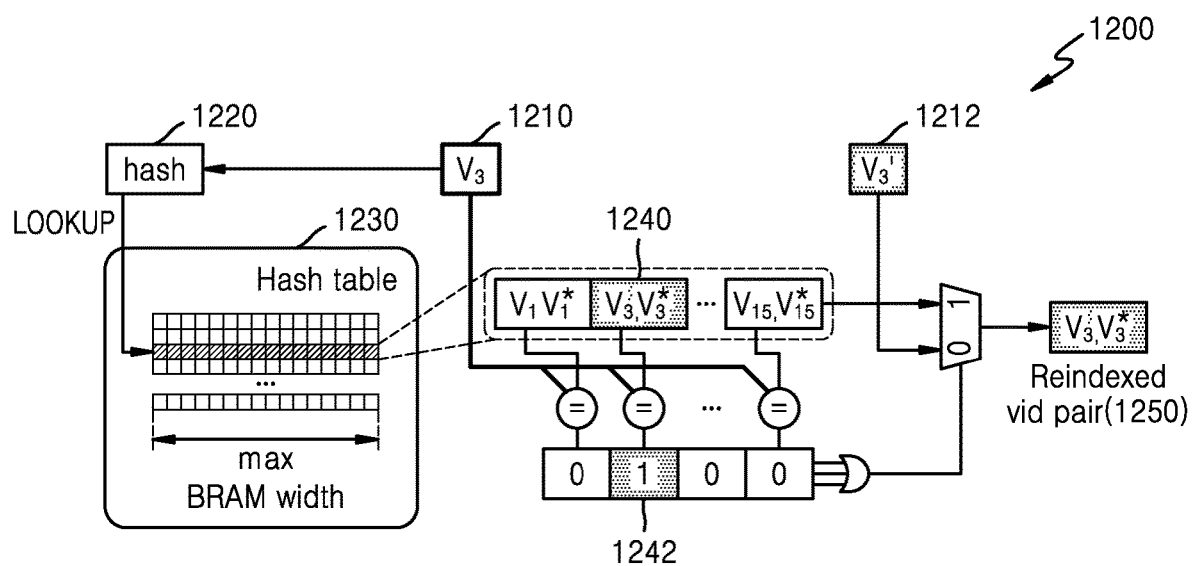
FIG. 12 is an example illustrating a re-indexer that performs parallel processing, according to an embodiment.

FIG. 12 is an example illustrating a re-indexer that performs parallel processing, according to an embodiment.

A re-indexer 1200 may maintain a relationship between VID $V_3$ 1240 assigned to an original node and a newly assigned VID $V_3'$ 1212 through a hash table 1230 and performs hash table lookup each time a new node is sampled. Once uniform random sampling for one neighbor node array is finished to generate a sub-graph in the set-partitioning accelerator, the re-indexer 1200 may immediately determine whether a selected node is a new node.

When a new node is selected, the re-indexer 1200 may obtain a hash table entry accessible through a hash value 1220 of the node. Each hash table entry may include several slots in which VIDs may be stored, and the several slots may be used for parallel operations. In an embodiment, the re-indexer 1200 may include as many comparators as slots of the hash table entry, and process the comparators in parallel.

Referring to FIG. 12, the re-indexer 1200 may access a hash table 1230 through the hash value 1220 of the sampled VID 1210 to read columns $(V_1,V_1^*),(V_3,V_3^*), \ldots ,(V_{15}, V_{15}^*)$ including elements with the same hash value. A plurality of comparators capable of comparing the original VID of each of the elements $(V_1,V_1^*),(V_3,V_3^*), \ldots ,(V_{15}, V_{15}^*)$ stored in the same column with sampled VIDs may be arranged in parallel to determine at a time whether the obtained hash table entry includes a node having the same VID as a VID assigned to a new node. When there is no node having the same VID, the re-indexer 1200 may determine whether an empty slot is in the corresponding hash table entry and thus a new node may be stored therein.

More specifically, the re-indexer 1200 may generate a match mask by comparing a new node $V_3$ 1210 with a VID of each slot of the hash table entry. When '1' 1242 exists in the match mask, the current node has been selected before, and thus a re-indexed VID V3* 1240 stored in a hash table 1230 may be returned.

When there is no '1' in the match mask, the corresponding node was never selected before, such that a new re-indexed value $V_3'$ 1212 may be added to the hash table 1230. The newly created re-indexed value, $V_3'$ 1212 could be made by incrementing a local register which holds the maximum value of all existing re-indexed values. To determine whether an empty slot is in the current entry of the hash table, each slot of the hash table entry may be compared with '0' to generate an empty mask.

When there is '0' in the empty mask, the empty slot exists in the corresponding hash table, such that a new node may be stored in the slot. When there is no '0' in the empty mask, the foregoing process may be repeated in the next hash table entry.

Figure 5:
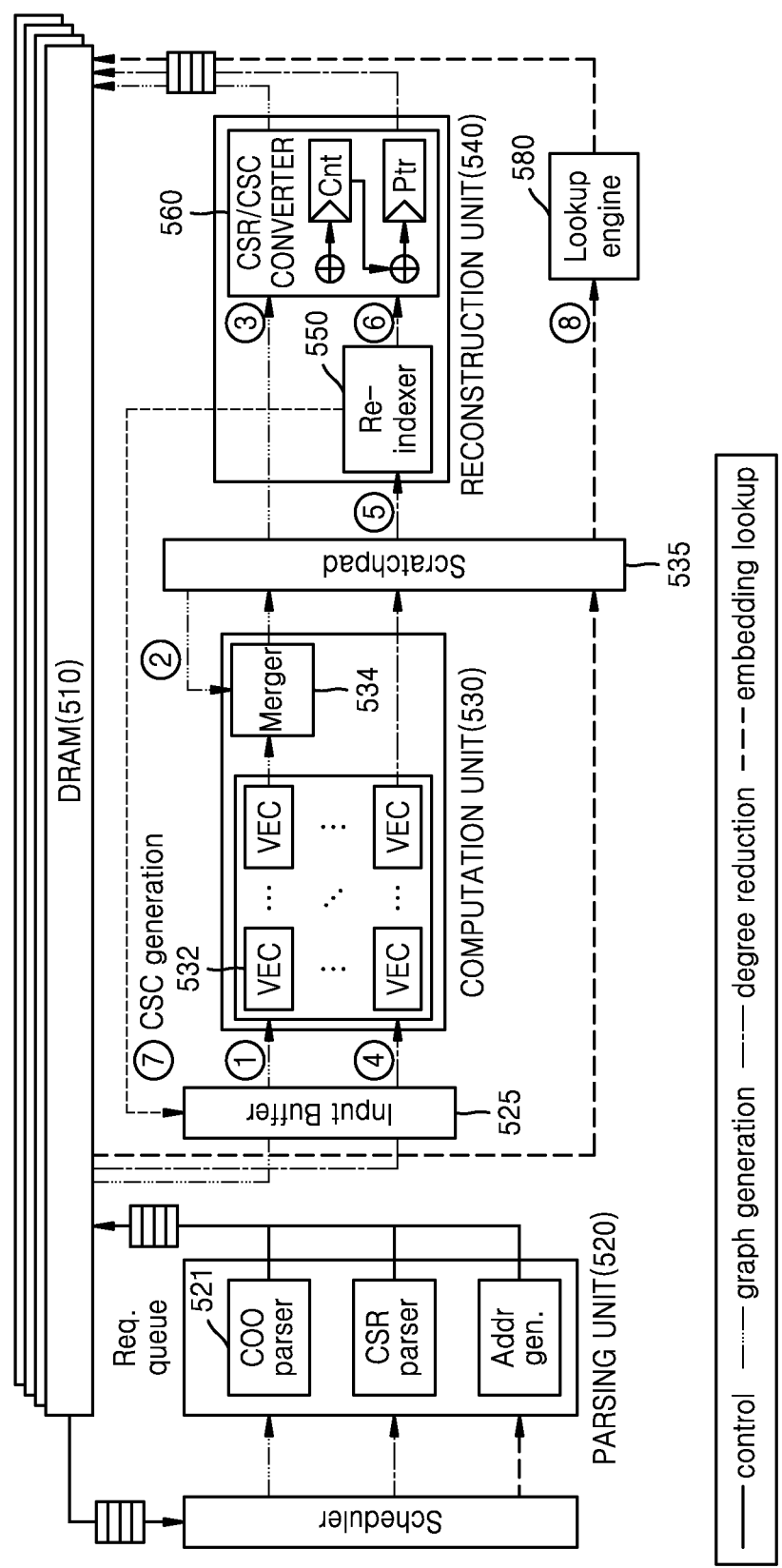
FIG. 5 is an example illustrating an apparatus for accelerating GNN pre-processing implemented with hardware, according to an embodiment.

FIG. 5 is an example illustrating an apparatus for accelerating GNN pre-processing implemented with hardware, according to an embodiment. An apparatus 500 for accelerating GNN pre-processing may receive the original graph and the embedding table as inputs from a user, generate a sub-graph with a reduced degree, and provide the generated sub-graph and a new embedding table corresponding thereto. This entire process may be accelerated through hardware.

Referring to FIG. 5, the apparatus 500 for accelerating GNN pre-processing may include a memory 510, a parsing unit 520, a computation unit 530, and a reconstruction unit 540. The reconstruction unit 540 may include a re-indexer 550 and a converter 560. The converter 560 may include a CRC converter and a CSC converter. The parsing unit 520 and the reconstruction unit 540 may communicate with the memory 510. The computation unit 530 may include at least one set-partitioning accelerator (vertex-edge processing core (VEC)) 532. The computation unit 530 may further include a merger 534.

The COO parsing unit 521 may read the COO original graph from the memory 510 and parse data into a form understandable by the apparatus 500 for accelerating GNN pre-processing. In FIG. 5, an example of the memory 510 may be a dynamic random access memory (DRAM). The COO parsing unit 521 may receive an address at which the original graph is stored and a size of the original graph as inputs, and transmit a read request for the original graph stored in the COO format to the memory 510. The parsing unit 520 may read the original graph in the COO format and then transmit (Source VID, Destination VID) including VIDs of a source node and a destination node of the original graph to the computation unit 530.

A set-partitioning accelerator 532 may generate a COO array of a preset length by sorting the input (Source VID, Destination VID) based on a source VID or a destination VID. The set-partitioning accelerator 532 may sort the COO array of the preset length within one cycle. To this end, the set-partitioning accelerator 532 may perform scanning and compacting. This will refer to the description of FIG. 6. In an embodiment, the COO array may include both a COO original graph, a COO array read to a certain length, and an array sorted by merging the COO array of the certain length. The COO original graph may be read in the unit of a COO array of a short length.

The merger 534 may merge sorted short COO arrays. The merger 534 may receive a maximum of preset a (a natural number greater>1) COO arrays from the set-partitioning accelerator 532 and merge the input COO arrays to output one sorted COO array.

Each time passing through the merger 534, COO arrays longer up to a times may be sorted. When the COO original graph is so large to exceed a COO arrays that may be merged at a time by the merger 534, the merger 534 may first merge the a COO arrays and store them in the buffer 535 and secondarily re-input a COO array sorted into one by first merging the a COO arrays to the merger 535.

The CSR converter 560 may read the sorted COO array one by one to convert the same into the graph in the CSR format. The converted graph in the CSR format may be transmitted to the memory 510. The converted graph in the CSR format may be used for an immediately next operation and thus may be transmitted to a parsing unit or a computation unit without being transmitted to the memory.

The set-partitioning accelerator 532 may select a preset number of nodes of a neighbor node array of a batch node to perform uniform random sampling. An example of performing uniform random sampling by the set-partitioning accelerator 532 will refer to FIG. 7. The set-partitioning accelerator 532 may generate a sub-graph including the selected nodes. The set-partitioning accelerator 532 may perform a process of reducing a degree of a graph for each batch. The re-indexer 550 may assign a new VID to each of the selected nodes of the sub-graph. An example of assigning a new VID in the re-indexer 550 will refer to FIG. 4.

In another embodiment, when GNN training is performed, a compressed sparse column (CSC) format graph of the degree-reduced graph is required. In this case, the re-indexer 550 may re-transmit the selected nodes of the sub-graph to the computation unit 530 and sort them, and the CSC converter 560 may convert them into the CSC format.

The apparatus 500 for accelerating GNN pre-processing may generate an embedding table corresponding to the sub-graph generated by the set-partitioning accelerator 532. The parsing unit 510 may transmit a read request for embeddings corresponding to the original VIDs of the selected nodes of the sub-graph to the memory 510. An embedding lookup engine 580 may directly read a feature vector of the selected nodes from the memory 510 without passing through the computation unit 530 and directly write the same at a desired position. The embedding lookup engine 580 may read an original embedding table by using the original VIDs of the selected nodes and store copied embeddings based on VIDs newly assigned by the re-indexer 550 respectively to the selected nodes. An example of the embedding table generation unit will refer to FIG. 10.

Figure 6:
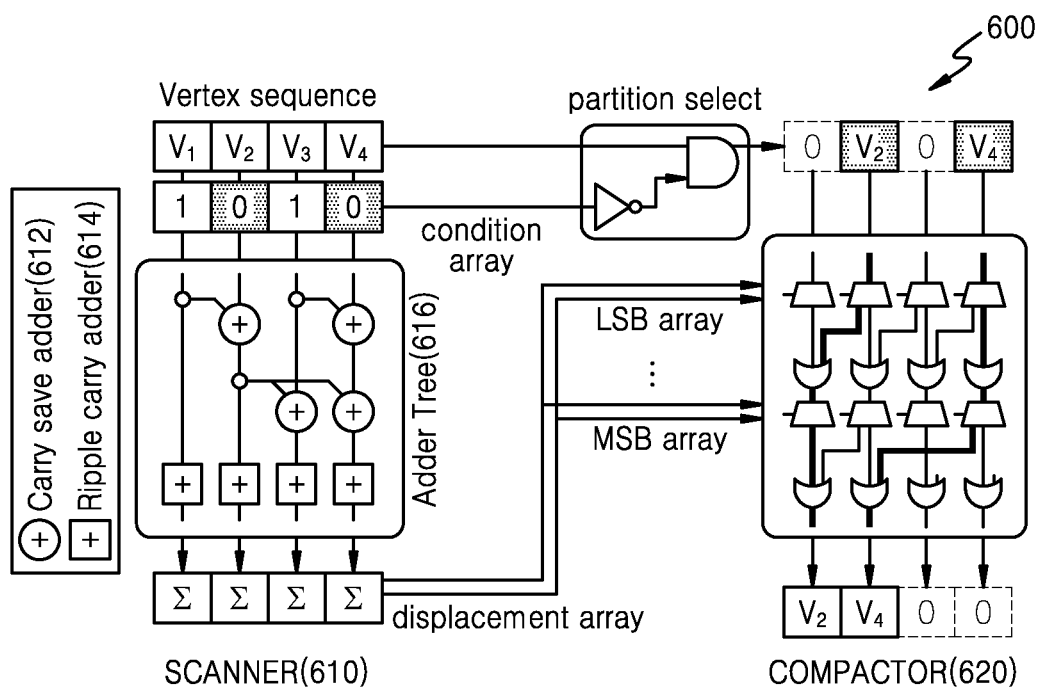
FIG. 6 is an internal structural diagram of a set-partitioning accelerator according to an embodiment.

FIG. 6 is an internal structural diagram of a set-partitioning accelerator according to an embodiment.

A set-partitioning accelerator 600 may include a scanner 610 and a compactor 620.

The scanner 610 may include an adder. The scanner 610 may scan how far each element has to move from its current position through set partitioning. The distance, or displacement, each element must move is referred to as a displacement array. The compactor 620 may receive the displacement array from the scanner 610 and move each element to the corresponding position.

In an embodiment, the scanner 610 may use a carry save adder 612 to minimize a delay occurring in scanning. The carry save adder 612 may separately output a carry of a previous bit instead of adding the same to the next bit, thereby preventing a delay of carry propagation.

Assuming an input width of N, the scanner 610 may include a row of log N adders. Each row may include N/2 adders, and in an $i^{th}$ row, an adder is in a column where a quotient divided by $2^i$ is even. Each adder in the $i^{th}$ row may be connected to its own column and a column of the greatest multiple of $2^{th}$ i less than the same. Adders in the last row of an adder tree 616 may use a ripple carry adder 614. The scanner 610 may compute a cumulative sum of an input array within one cycle.

Assuming an input width of N, the compactor 620 may include log N rows. Each row may include a multiplexer and an OR gate. The multiplexer may include two outputs in which a multiplexer in the $i^{th}$ row may be connected to an OR gate in the same column as itself and an OR gate in a column to the left from itself by $2^{th}$ (i−1). To a selected pin of each multiplexer, an $i^{th}$ bit may be connected in which a distance to move to the left is expressed as a binary number.

Figure 7:
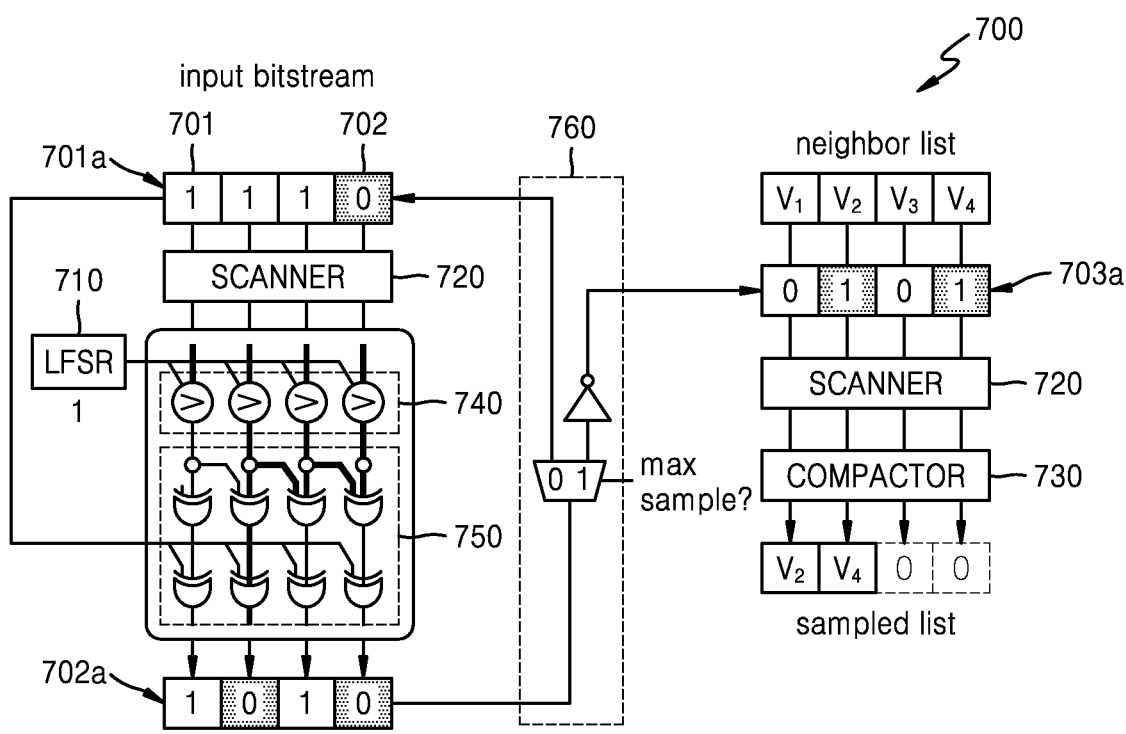
FIG. 7 is an example illustrating uniform random sampling performed by using a set partitioning accelerator according to an embodiment.

FIG. 7 is an example illustrating uniform random sampling performed in a set partitioning accelerator according to an embodiment.

A set-partitioning accelerator 700 shown in FIG. 7 may further include a comparator 740, a selector 750, and an update unit 760 in addition to the set set-partitioning accelerator 600 shown in FIG. 6. In an input stream of FIG. 7, a selection bit of a node not selected before is expressed as '1' 701 and a selection bit of a selected node is expressed as '0' 702. The set-partitioning accelerator 700 may select one of nodes not selected in the input bitstream by using the scanner 720 and change the selected bit from '1' into '0'.

The set-partitioning accelerator 700 may generate a random number r by using a linear feedback shift register (LFSR) 710. The comparator 740 may compare the random number r with a result of the scanner 720 and then select a $r^{th}$ node from among nodes not selected by the selector 750. The update unit 760 may update a selection bit of a newly selected node from '1' into '0'. The set-partitioning accelerator 700 may perform repetition until preset s bits are selected at random from the input bitstream, and then perform set-partitioning. FIG. 7 shows an example where the set-partitioning accelerator 700 finally samples ($V_2$, $V_4$) among $V_1$, $V_2$, $V_3$, and $V_4$. In "1110" 701a of the input bitstream, a $4^{th}$ element has been selected. When the LFSR 710 generates a random number 1, an input array may be 1010 702a upon selection of the second element from the input bitstream "1110". The update unit 760 may determine whether the selection unit selects a preset maximum number, s, of samples. In case of true, a NOT circuit operation may be applied to the input array 1010 702a to deliver "0101" 703a.

The scanner 720 and the compactor 730 may collect second and fourth nodes ($V_2$, $V_4$) by using "0101" 703a. The set-partitioning accelerator 700 may deliver the selected node array ($V_2$, $V_4$) to the reconstruction unit 540 of FIG. 5.

Figure 8:
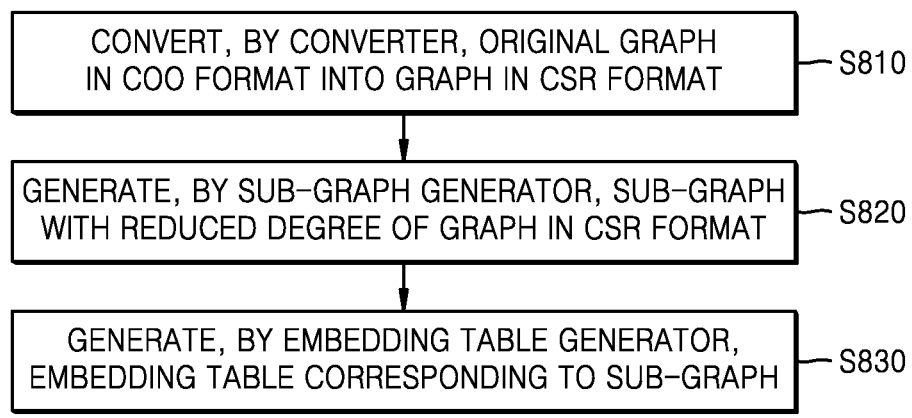
FIG. 8 is a flowchart of a method of accelerating GNN pre-processing, according to an embodiment.
Figure 9:
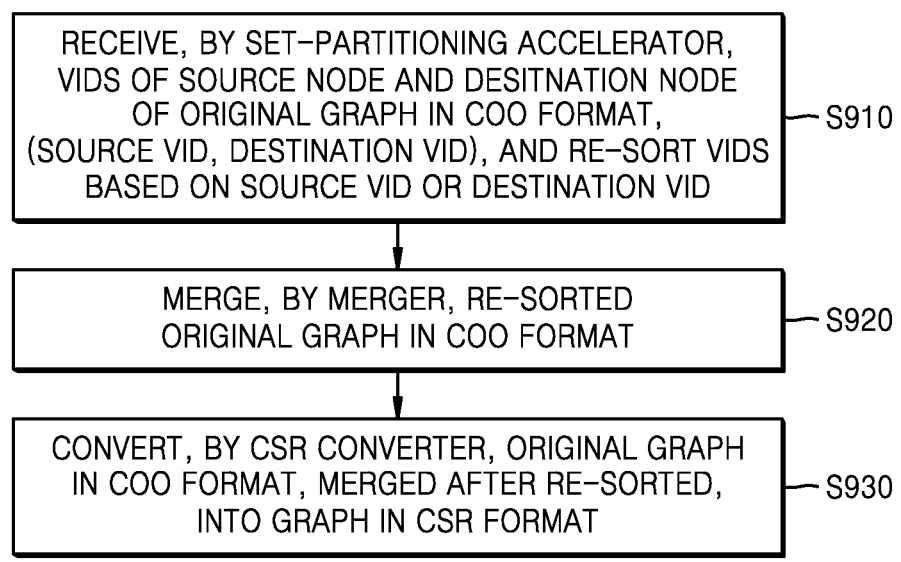
FIG. 9 is a flowchart for converting a coordinate list (COO) format into a compressed sparse row (CSR) format in an apparatus for accelerating GNN pre-processing, according to an embodiment.

FIG. 8 is a flowchart of a method of accelerating GNN pre-processing, according to an embodiment. The conversion unit may convert the original graph in the stored edge-centric COO format into the node-centric CSR format graph, in operation S810. Referring to FIG. 9, the conversion unit may convert the COO format into the CSR format by using the set-partitioning accelerator, the merger, and the CSR converter.

The set-partitioning accelerator receives VIDs of the source node and the destination of the original graph in the COO format, (Source VID, Destination VID), and sort the original graph in the COO format based on Source VID or Destination VID, in operation S910. In this case, the set-partitioning accelerator may transmit the sorted COO array having a set length n to the merger. The merger may merge the sorted COO arrays in operation S920. The sorted and merged COO array may be transmitted to the CSR converter. The CSR converter may convert the sorted and merged COO array into the graph in the CSR format, in operation S930.

The sub-graph generation unit may generate a sub-graph by reducing a degree of the graph in the CSR format converted by the converter, in operation S820. The embedding table generation unit may generate an embedding table corresponding to the sub-graph, in operation S830.

Figure 10:
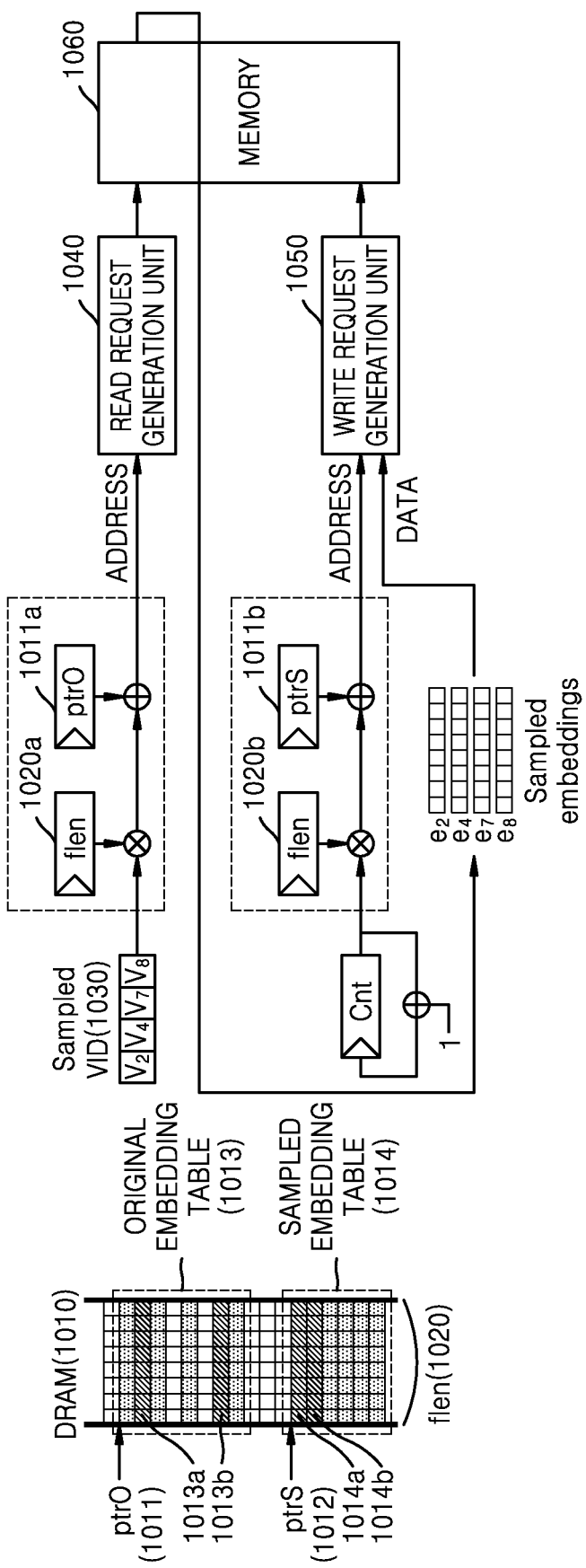
FIG. 10 is an internal structural diagram of an embedding table generation unit, according to an embodiment.

FIG. 10 is an internal structural diagram of an embedding table generation unit, according to an embodiment.

The embedding table may refer to a table in which embedding vectors of respective nodes are clustered. The embedding vectors are stored at consecutive addresses in order from node 0. All embedding vectors have the same length. In FIG. 10, a length of an embedding vector is flen 1020.

ptrO 1011 indicates a start address of an original embedding table 1013 stored in a DRAM 1010, and ptrS 1012 indicates a start address of an embedding table 1014 stored in the DRAM 1010. The sampled embedding table 1013 may include sampled embeddings 1014a and 1014b obtained by sampling sampled embeddings 1013a and 1013b in an original embedding table 1014.

The embedding table generation unit may receive VIDs of sampled nodes, $V_2$, $V_4$, $V_7$, and $V_8$, and multiply them by the length of the embedding vector, flen 1020a, and add ptrO 1011a thereto, thus obtaining am embedding start address. A read request generation unit 1040 may transmit a read request for reading data to a length of an embedding vector from the embedding start address to a memory 1060. The read embeddings $e_2$, $e_4$, $e_7$, and $e_8$ may be temporarily stored in a buffer.

When transmitting a write request, the embedding table generation unit may store an embedding read from an address as far as the length of the embedding vector, starting from ptrS 1011b. To this end, a counter register cnt may count a total number of embeddings stored so far.

A length of the embedding vector, flen 1020b, may be multiplied to the counter register cnt and ptrS 1011b may be added thereto, thus obtaining an embedding target address. A write request generation unit 1050 may transmit a write request to the memory 1060 by using the embedding target address and $e_2$, $e_4$, $e_7$, and $e_8$ stored in the buffer.

Figure 11:
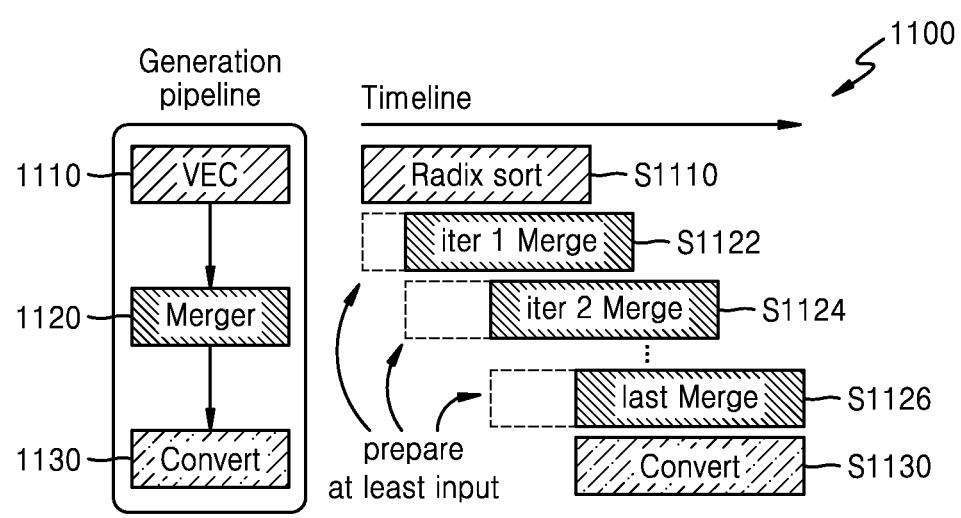
FIG. 11 shows pipelining of an integration unit according to an embodiment.

FIG. 11 shows pipelining of an integration unit according to an embodiment.

A set-partitioning accelerator 1110 may perform set-partitioning by using a $k^{th}$, bit of the VID, starting from a least significant bit (LSB) of the VID of the original graph in the COO format. In this way, the set-partitioning accelerator 1110 may perform radix sorting in operation S1110. The set-partitioning accelerator 1110 may sort the original graph in the COO format based on Source VID or Destination VID to generate a sorted COO array of a preset length. The sorted COO arrays may be sequentially transmitted to a merger 1120.

The merger 1120 may merge input COO arrays immediately upon input of COO arrays and output one sorted COO array, without waiting for the set-partitioning accelerator 1110 to sort the entire COO original graph based on Source VID or Destination VID, in operation S1122. The merger 1120 may input an array of a length "a", a predefined value, times longer on each iteration to generate a longer COO array, in operations S1124 to S1126. Each time passing through the merger 1120, COO arrays longer up to a times may be sorted and merged. When the merger 1120 performs the last merging in operation S1126, it may parallelly transmit the finally sorted COO array sequentially from the first edge to the converter 1130.

Referring to a timeline 1100, when the merger 1120 performs first merging in operation S1122, second merging in operation S1124, and the last merging in operation S1126, pipelining with the set-partitioning accelerator 1110 may be possible. When generation of the COO array with the preset length sorted by the set-partitioning accelerator 1110 is finished, the merger may perform the last merging in operation S1126 and the converter 1130 may also perform conversion in operation S1130. A converter 1130 may process one element each time computation of one element is finished in the last merging process, such that pipelining with the last merging process may be possible.

In another embodiment, a plurality of mergers may be used. When the plurality of mergers are used, pipelining among the plurality of mergers may be performed.

In an embodiment, when a plurality of COO sorted in the computation unit are generated, first a COO may be merged by a first merger and next a COO sorted during computation of the first merger may be merged by a second merger.

In another embodiment, when a sorting length of the computation unit is n, a case is assumed where a COO array longer than n*a*a is sorted. When a or more sorted arrays of a length of n*a, which are first merged, are generated during merging of the array generated by the computation unit by the first merger, the second merger may secondarily merge the corresponding arrays. In this case, when the second merger performs secondary merging, the first merger may continue first merging of the sorted arrays produced in the computation unit.

Figure 13:
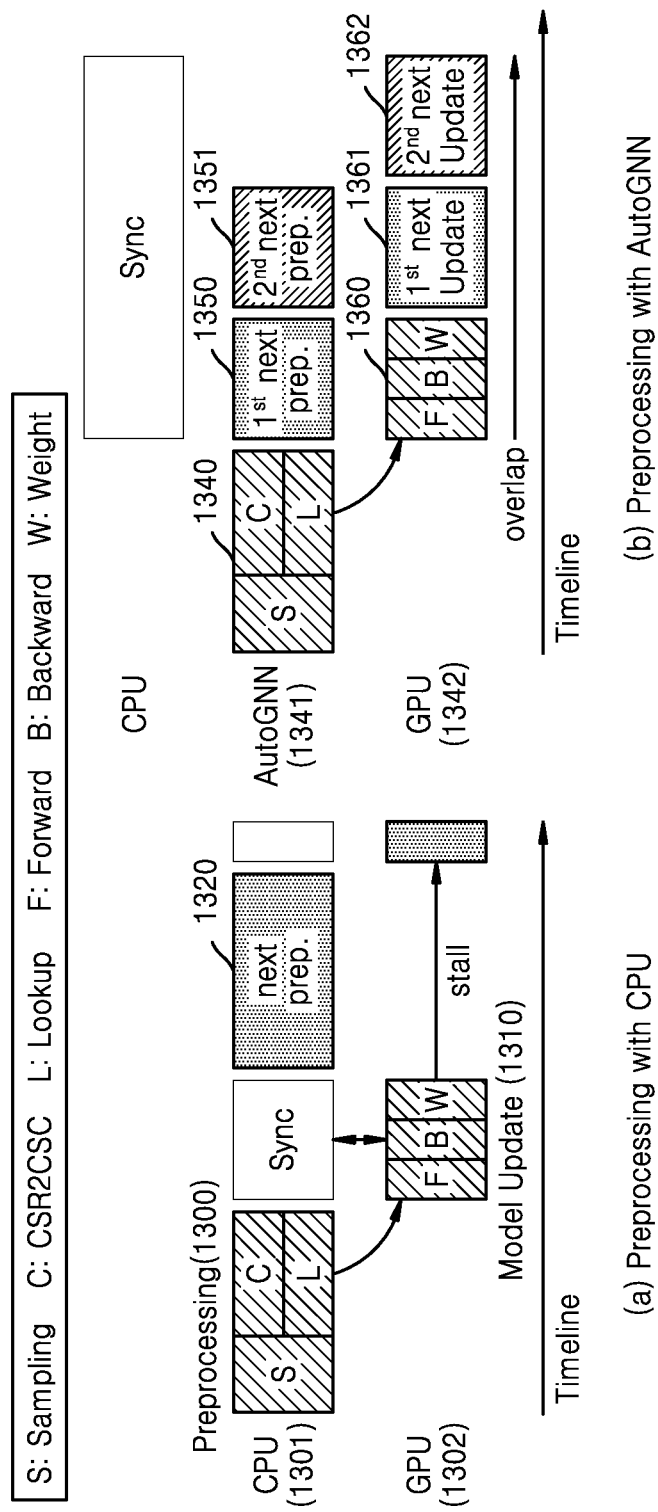
FIG. 13 is an example illustrating a GNN pre-processing operation and a GNN operation that are performed in parallel in a GNN training process, according to an embodiment.

FIG. 13 is an example illustrating a GNN pre-processing operation and a GNN operation performed in parallel in a GNN training process, according to an embodiment.

In an embodiment, an apparatus for accelerating GNN pre-processing may perform GNN training as well as GNN interference. Unlike GNN inference, a GNN training process has a structure where several batches are repeated. In an embodiment, the apparatus for accelerating GNN pre-processing may perform a GNN pre-processing operation and a GNN model operation in parallel. This is because data dependency exists between GNN model operations among the batches.

In a related art, the GNN operation is performed in collaboration between a host central processing unit (CPU) 1301 and a graphics processing unit (GPU) 1302. As pre-processing is performed by the host CPU 1301, the GNN pre-processing operation and the GNN model operation may not be performed in parallel. Pre-processing for performing training may require three operations including uniform random sampling, an operation for converting CSR into CSC, and embedding table lookup. A model update operation 1310 may include three operations including forward propagation, backward propagation, and weight update.

In a related art, the CPU 1301 needs to exchange new data, an update value, etc., with the GPU 1302 through communication for each training 1310, and the CPU 1301 has to give a new task to the GPU 1302. Thus, it is difficult to perform pipelining of pre-processing 1320 of the next training during training 1310.

In an embodiment, as an apparatus 1341 for accelerating GNN pre-processing may perform all operations of pre-processing without intervention of the host CPU, the apparatus 1341 may perform GNN pre-processing operations 1340, 1350, and 1351 in parallel while the GPU 1342 performs GNN model operations 1360, 1361, and 1362. Thus, a pre-processing operation time may be overlapped with the model update operations and therefore a GNN training throughput may be increased. In a pre-processing process for performing training, an operation for converting CSR into CSC may be performed in the set-partitioning accelerator and embedding table lookup may be processed by the embedding lookup engine 580 of FIG. 5.

The apparatus described above may be implemented by a hardware element, a software element, and/or a combination of the hardware element and the software element. For example, the apparatus and elements described in the embodiments may be implemented using one or more general-purpose or special-purpose computers such as, for example, a processor, a controller, an arithmetic logic unit (ALU), a digital signal processor, a microcomputer, a field programmable gate array (FPGA), a programmable logic unit (PLU), a microprocessor, or any other device capable of executing and responding to instructions. A processing device may execute an operating system (OS) and one or more software applications running on the OS. The processing device may access, store, manipulate, process, and generate data in response to execution of software. For convenience of understanding, it is described that one processing device is used, but those of ordinary skill in the art would recognize that the processing device includes a plurality of processing components and/or a plurality of types of processing components. For example, the processing device may include a plurality of processors or one processor and one controller. Alternatively, other processing configurations such as parallel processors may be possible.

The method according to the embodiments may be implemented in the form of program commands that can be executed through various computer components and recorded in a computer-readable recording medium. The computer-readable recording medium may include a program command, a data file, a data structure and the like solely or in a combined manner. The program command recorded in the computer-readable recording medium may be a program command specially designed and configured for the embodiments or a program command known to be used by those skilled in the art of the computer software field. Examples of the computer-readable recording medium may include magnetic media such as hard disk, floppy disk, and magnetic tape, optical media such as compact disk read only memory (CD-ROM) and digital versatile disk (DVD), magneto-optical media such as floptical disk, and a hardware device especially configured to store and execute a program command, such as read only memory (ROM), random access memory (RAM), flash memory, etc. Examples of the program command may include not only a machine language code created by a complier, but also a high-level language code executable by a computer using an interpreter.

While embodiments have been described by the limited embodiments and drawings, various modifications and changes may be made from the disclosure by those of ordinary skill in the art. For example, even when described techniques are performed in a sequence different from the described method and/or components such as systems, structures, devices, circuits, etc. are combined or connected differently from the described method, or replaced with other components or equivalents, an appropriate result may be achieved. Therefore, other implementations, other embodiments, and equivalents to the claims may also fall within the scope of the claims provided below.

In an embodiment, the apparatus for accelerating GNN pre-processing may accelerate and automate a graph operation for a GNN operation from beginning to end through hardware.

In an embodiment, the apparatus for accelerating GNN pre-processing may transmit data of a pre-processed graph to a host or a model operation accelerator without intervention of a CPU.

In an embodiment, the apparatus for accelerating GNN pre-processing may perform GNN training as well as GNN interference.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A method of accelerating graph neural network (GNN) pre-processing, the method comprising:
performing, by a set-partitioning accelerator, radix sorting based on a vertex identification (VID) of an original graph in a coordinate list (COO) format to generate a COO array of a preset length;
merging, by a merger, the COO array of the preset length to generate one sorted COO array;
converting, by a converter, the one sorted COO array into a compressed sparse row (CSR) format to generate a graph in a CSR format;
performing, by a set-partitioning accelerator, uniform random sampling, to generate a sub-graph with a reduced degree of the graph in the CSR format; and
generating, by an embedding table generation unit, an embedding table corresponding to the sub-graph,
wherein when the merger is provided as a plurality of mergers, pipelining is performed among the plurality of mergers.

2. The method of claim 1, wherein the merger is configured to perform a process of merging the COO array before the set-partitioning accelerator completes radix sorting of the original graph in the COO format.

3. The method of claim 1, wherein each of the plurality of mergers is configured to receive a maximum of a preset COO arrays from the set-partitioning accelerator and merge the input COO arrays to output one sorted COO array.

4. The method of claim 1, further comprising assigning, by a re-indexer, a new VID to each of selected nodes forming the sub-graph.

5. The method of claim 4, wherein the re-indexer comprises as many comparators as a number of slots of a hash table entry, and is configured to perform parallel processing on the comparators to determine whether the selected node is a new node.

6. The method of claim 4, wherein when the set-partitioning accelerator finishes performing uniform random sampling on one neighbor node array, the re-indexer is further configured to determine whether the selected node is a new node.

7. The method of claim 1, wherein the set-partitioning accelerator is configured to perform an operation for converting a CSR required in a pre-processing process for performing training into a compressed sparse column (CSC).

8. An apparatus for accelerating graph neural network (GNN) pre-processing, the apparatus comprising:
a set-partitioning accelerator configured to sort each edge of an original graph stored in a coordinate list (COO) format by a node number, perform radix sorting based on a vertex identification (VID) to generate a COO array of a preset length, and perform uniform random sampling on some nodes of a given node array;
a merger configured to merge the COO array of the preset length to generate one sorted COO array;
a re-indexer configured to assign new consecutive VIDs respectively to the nodes selected through the uniform random sampling; and
a compressed sparse row (CSR) converter configured to the edges sorted by the node number into a CSR format.

9. The apparatus of claim 8, wherein the merger is further configured to perform a process of merging the COO array before the set-partitioning accelerator completes radix sorting of the original graph in the COO format.

10. The apparatus of claim 9, wherein the merger is provided in a plurality of mergers capable of pipelining.

11. The apparatus of claim 8, wherein the re-indexer comprises as many comparators as a number of slots of a hash table entry, and is further configured to perform parallel processing on the comparators to determine whether the selected node is a new node.

12. The apparatus of claim 8, wherein when the set-partitioning accelerator finishes performing uniform random sampling on one neighbor node array, the re-indexer is further configured to determine whether the selected node is a new node.

13. The apparatus of claim 8, wherein the set-partitioning accelerator is further configured to perform an operation for converting a CSR required in a pre-processing process for performing training into a compressed sparse column (CSC).

14. A computer-readable recording medium for implementing a program of the method of accelerating GNN pre-processing according to claim 1.

* * * * *